United States Patent
Taugher

(10) Patent No.: US 6,885,627 B1
(45) Date of Patent: *Apr. 26, 2005

(54) WRITE PROTECT FOR REWRITABLE COMPACT DISKS AND DIGITAL VIDEO DISKS

(75) Inventor: Lawrence N Taugher, Loveland, CO (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 952 days.

(21) Appl. No.: 08/823,823

(22) Filed: Mar. 25, 1997

(51) Int. Cl.[7] .................................................. G11B 7/24
(52) U.S. Cl. ................................ 369/275.2; 369/53.21; 720/719
(58) Field of Search .......................... 369/30.11, 47.15, 369/53.21, 275.2, 275.1, 32, 47, 54, 58, 275.3, 116, 48, 290, 283, 284, 289, 291, 292; 720/720, 724, 719; 428/64.2, 64.3, 64.4

(56) References Cited

U.S. PATENT DOCUMENTS

| | | | | |
|---|---|---|---|---|
| 4,658,393 A | * | 4/1987 | Ohta et al. | 369/290 |
| 5,442,609 A | | 8/1995 | Yanagawa | 369/44.28 |
| 5,537,387 A | * | 7/1996 | Ando et al. | 369/275.1 |
| 5,546,365 A | | 8/1996 | Roth | 369/32 |
| 5,706,047 A | * | 1/1998 | Lentz et al. | 347/262 |
| 5,818,807 A | * | 10/1998 | Kuroda et al. | 369/116 |
| 6,081,501 A | * | 6/2000 | Hunter et al. | 369/290 |
| 6,192,025 B1 | * | 2/2001 | Chen | 369/291 |
| 6,236,638 B1 | * | 5/2001 | Hunter et al. | 369/290 |
| 6,302,176 B1 | * | 10/2001 | Chen | 156/391 |
| 6,480,463 B2 | * | 11/2002 | Hunter et al. | 369/290 |

FOREIGN PATENT DOCUMENTS

| | | |
|---|---|---|
| EP | 0346979 A2 | 12/1989 |
| EP | 0557584 A1 | 9/1993 |
| JP | 401059665 | 3/1989 |
| JP | 404095287 | 3/1992 |
| JP | 409120621 | 5/1997 |
| JP | 09097473 | 8/1997 |

OTHER PUBLICATIONS

Philips Electronics N.V., "CD Recordable & CD Writable", http://www-eu.sv.philips.com/newtech/artech_right.html, Aug. 9, 1998.

Parker and Starrett, "CD-ROM Professional's CD-Recordable Handbook: The Complete Guide to Practical Desktop CD Recording", pp. 82–85, Pemberton Press, 1996.

* cited by examiner

Primary Examiner—Ali Neyzari
(74) Attorney, Agent, or Firm—Augustus W. Winfield

(57) ABSTRACT

A method and apparatus for write protection of rewritable compact disks and digital video disks. A Power Calibration Area is covered to prevent the drive laser from completing a calibration procedure. In one embodiment, the disk has an indented area formed around the central hole in the disk. A ring shaped plug is inserted into the indented area, with an extended surface that covers the calibration area. In an alternative embodiment, an adhesive label, ink, dye or paint is used. In still another alternative embodiment, the calibration area is mechanically abraded to provide permanent write protection. Finally, the laser in the drive may be used to darken, damage or destroy the calibration area or a transparent label over the calibration area, for permanent write protection.

11 Claims, 3 Drawing Sheets

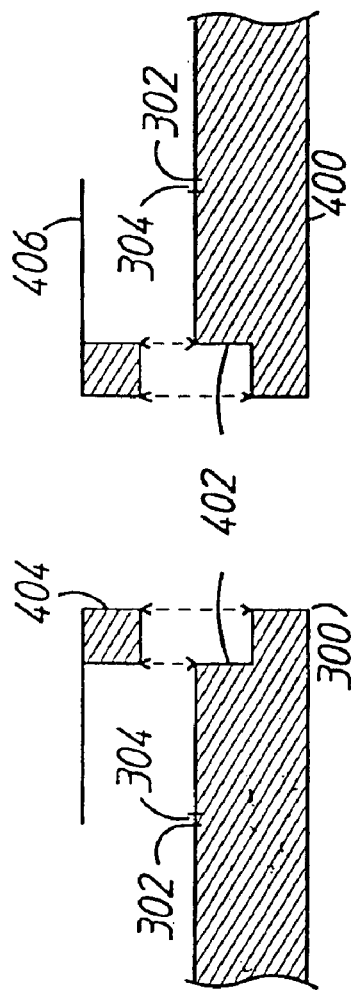
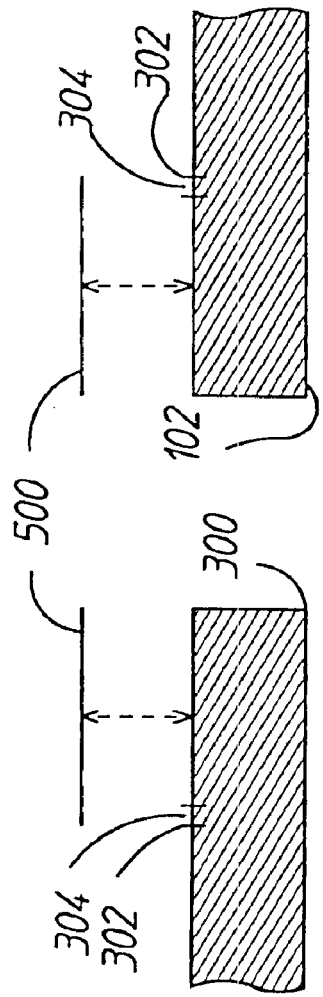
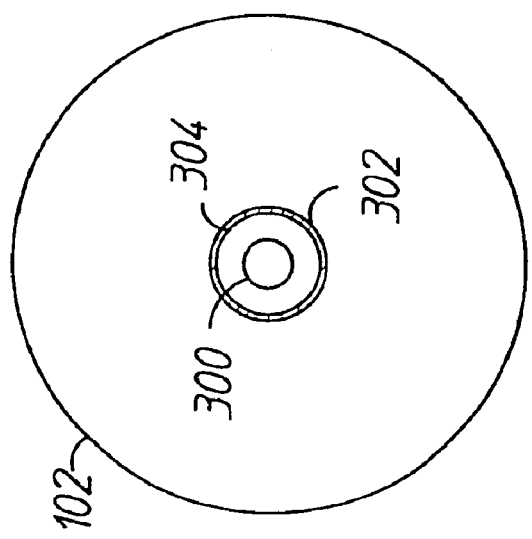
FIGURE 3 (PRIOR ART)
FIGURE 4
FIGURE 5

WRITE PROTECT FOR REWRITABLE COMPACT DISKS AND DIGITAL VIDEO DISKS

FIELD OF INVENTION

This invention relates generally to digital mass memory media and more specifically to rewritable compact discs.

BACKGROUND OF THE INVENTION

In general, there are three types of digital optical discs: read-only, recordable (also called Write-Once or Write-Once-Read-Many (WORM)) and rewritable (also called erasable). Examples of commercially available read-only optical disc technologies are the Compact Disc (CD) for digital audio and the Compact Disc-Read Only Memory (CD-ROM) for computer data. Compact Disc-Recordable (CD-R) drives and media are also commercially available. An example of a rewritable (erasable) optical disc technology is the Magneto-Optic (MO) disc, widely used for computer data storage. Rewritable compact disks (CD-RW), and rewritable Digital Video Disks (DVD, also called Digital Versatile Disks) will be commercially available soon.

Rewritable mass memory media is typically contained in a rigid cartridge during operation and the cartridge typically includes a write-protect feature to protect information on a storage medium from being destroyed. For example, most data tape cartridges have a moveable plastic tab that can be moved to one of two positions. Similarly, flexible diskettes in hard plastic cases have a sliding or breakaway plastic tab. CD's and DVD's, however, are not in a cartridge during operation. Write protection for CD's and DVD's must be implemented directly on the medium. Solutions have been proposed that are software based. That is, if a particular bit or data field has a particular value, software (operating system or drive controller) is not supposed to overwrite data on the medium. However, software solutions require support by all operating systems or drives. If a disk is created by one operating system or drive controller that supports a software write protect feature, and then is taken to a system that does not support the feature, data may be inadvertently destroyed. In addition, a software virus could bypass software write protection to delete data on the disk. There is a need for a physical write protect feature, directly on the disk medium, that protects against writing for any software.

SUMMARY OF THE INVENTION

Industry standard CD-RW drives use a phase change material having a transparency that can be reversibly changed by heating, and then cooling at a controlled rate. A laser is used to heat, and then cool small areas at a controlled rate. Laser power must be calibrated for each disk medium. Before writing or erasing, a standard CD-RW drive must successfully calibrate laser power by writing into a Power Calibration Area on the medium. If the drive cannot read its calibration patterns in the Power Calibration Area, it will not erase or write in the data area of the disk. In some example embodiments of the invention, the Power Calibration Area is temporarily obscured, preventing a successful calibration. For example, the Power Calibration Area may be covered by removable opaque plastic rings or adhesive labels. In other example embodiments, the Power Calibration Area is permanently obscured or covered for permanent write protection. For example, the surface of the disk in the Power Calibration Area may be scratched or abraded. Finally, the phase change material in the Power Calibration Area may be intentionally damaged, rendering the disk permanently write protected.

BRIEF DESCRIPTION OF THE DRAWINGS

FIG. 3 is a plan view of the surface of a rewritable disk medium.

FIG. 4 is a cross-section side view of a disk with a write protect ring in accordance with one example embodiment of the invention.

FIG. 5 is a cross-section side view of a disk with an adhesive label in accordance with an alternative embodiment of the invention.

DETAILED DESCRIPTION OF THE PREFERRED EMBODIMENT OF THE INVENTION

Figure 1:
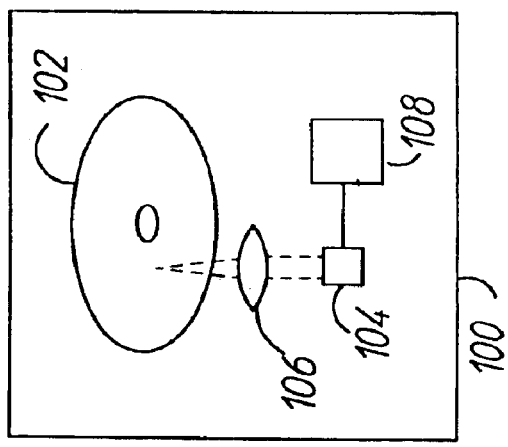
FIG. 1 is a block diagram of a disk drive with laser and disk medium.

FIG. 1 illustrates a disk drive 100 with a rewritable disk 102. A laser system 104 writes and reads through an optics system 106. An electronic controller 108 controls power for the laser 104 and extracts data from a return signal.

Figure 2:
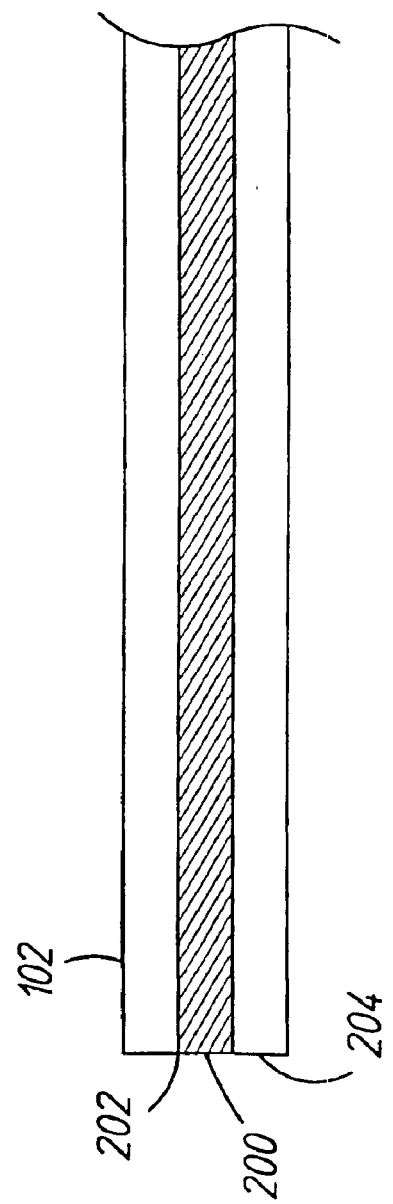
FIG. 2 is a cross-section of the disk medium of FIG. 1.

FIG. 2 illustrates some of the layers of a rewritable disk medium. CD-RW media and proposed rewritable DVD media typically use a phase change material 200 for defining bits of information. Small areas of the material are heated by a laser (FIG. 1, 104) to one of two temperatures, and then allowed to cool at one of two controlled rates by controlling the rate of decrease in laser power. The phase change material 200 becomes crystalline (transparent) when heated to just below its melting point and then cooled at a relatively slow rate, and amorphous (opaque) when heated above its melting point and then cooled quickly. For transparent areas, laser light passes through the phase change material 200 and is reflected off a reflective layer 202. For amorphous areas, the laser light is scattered or absorbed and little light is reflected. A transparent layer 204 serves as a protection layer and additional support for stiffness.

FIG. 3 illustrates additional detail for disk 102. The disk 102 has a central hole 300. Standard rewritable disks are 118 mm in diameter, with a 15 mm diameter hole. A circle 302 having a diameter of 50 mm defines the beginning of the data area. Data is written along a single spiral track, starting at the inner edge 302 of the data area and spiraling outward toward the edge of the disk. In read-only or write-once media, the ring shaped area between the bole 300 and circle 302 is not used. In rewritable media, a Power Calibration Area 304 (having an inner diameter of 44.7 mm and an outer diameter of 45.5 mm) just inside the circle 302 is used for laser power calibration. The drive laser system writes, and then reads, various test patterns in the Laser Calibration Area to calibrate the peak power and rate of decrease of power. Laser writing power must be calibrated for each disk. Physical write protection may be provided by preventing laser power calibration. In addition, there is a Program Memory Area (not separately illustrated) (having an inner diameter of 45.5 mm and an outer diameter of 45.7 mm) just inside the circle 302. The Program Memory Area is used for a table of contents used only during writing.

FIG. 4 illustrates a first example embodiment of the invention. In FIG. 4, for a disk 400, the central hole has a larger than standard diameter for part of the thickness of the disk, forming a depressed area 402 around the standard diameter hole 300. A ring 404 may be inserted into the depressed area 402, the ring having a thin opaque top portion 406. When ring 404 is inserted, the Power Calibration Area 304 is covered by the opaque top portion 406, thereby preventing laser power calibration, thereby providing write protection. Top portion 406 preferably covers all the Power Calibration Area 304, and may cover part of the Program Memory Area, but must not cover any of the data area. That is, for the disk format dimensions discussed above, top portion 406 has a minimum outer diameter greater than 44.7 mm and a maximum outer diameter of 50 mm. Note that the laser (FIG. 1, 104) operates at a particular wavelength, so that "opaque" means that the top portion 406 is sufficiently non-transparent at the wavelength of the laser to prevent a successful laser power calibration. The ring 404 may be made removable. The ring 404 may include flexible material, springs, detents or other retaining details (not illustrated) to prevent the ring 404 from falling out when inverted or mechanically shocked.

FIG. 5 illustrates an second example embodiment of the invention. In FIG. 5, a disk 102 has a standard central hole 300, and an opaque ring-shaped adhesive label 500 is attached to the disk 102. The ring-shaped label 500 has a maximum inner diameter of 44.7 mm, a minimum outer diameter greater than 44.7 mm and a maximum outer diameter less than 50 mm. When label 500 is attached, laser power calibration is prevented. The label 500 may be made removable, or alternatively the label adhesive may be made essentially non-removable for permanent write protection. As an alternative to an adhesive label 500, the Power Calibration Area 304 may be covered by an opaque dye, ink, or paint. Again, "opaque" means that the material is sufficiently non-transparent at the wavelength of the laser to prevent power calibration of the laser.

The Power Calibration Area 304 (including the Program Memory Area) band is relatively narrow (5.3 mm), and any write protection feature must not cover any of the data area (it is OK to cover part or all of the Program Memory Area). Therefore, there is a need for relatively precise alignment of the write protect feature. That is, for the particular specified dimensions, the write protect feature must have a minimum outer diameter greater than 44.7 mm and a maximum outer diameter less than 50 mm. As a result, the ring 404 of FIG. 4 is preferable to the adhesive label 500 of FIG. 5, since the ring 404 is self aligning. A label (or dye or ink or paint) may require a fixture to ensure proper alignment.

Figure 6:
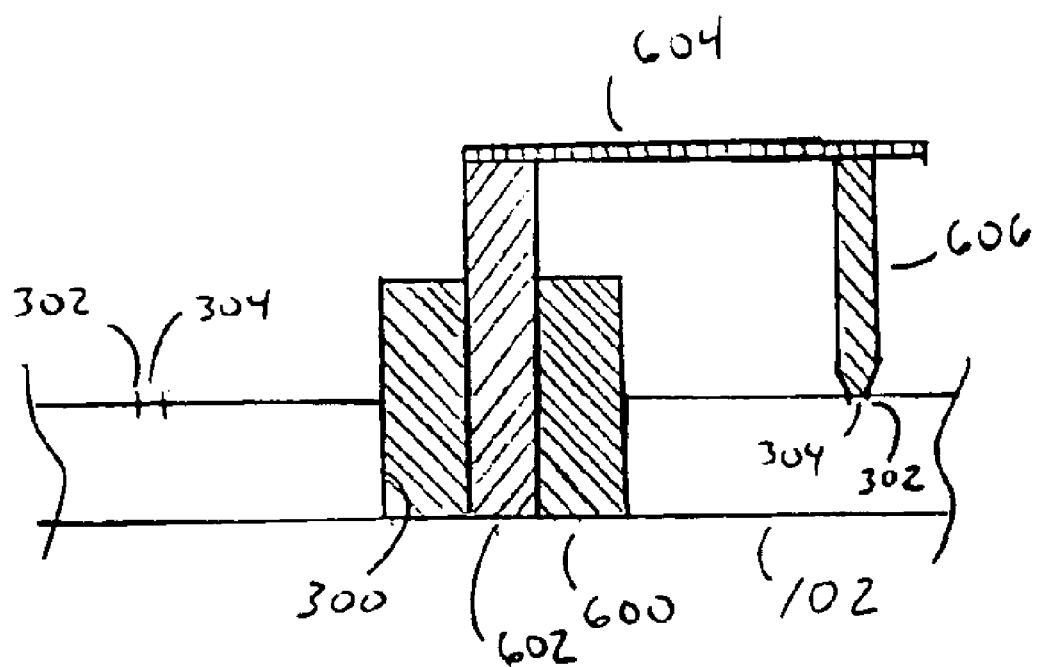
FIG. 6 is a cross section side view of a disk with a mechanical device for abrading or scratching the surface of the disk.

FIG. 6 illustrates still another alternative embodiment. Permanent write protection may be accomplished if the Power Calibration Area 304 (either the phase change material or the transparent cover layer) is partially damaged or destroyed. With proper alignment, mechanical abrasion may be used to roughen the surface of the disk at the Power Calibration Area 304. FIG. 6 illustrates a self-aligning holder 600 in the hole 300, with a rotating shaft 602, an attached arm 604, and a mechanical blade 606 that scratches or abrades the surface of the disk sufficiently to provide permanent write protection.

Alternatively, the laser in the drive may be used to damage the Power Calibration Area 304 or a coating on the Power Calibration Area. In general, a drive provides at least two angular velocities for the disk, with a relatively high laser power at a high angular velocity and a relatively low laser power at a low angular velocity. By selecting the highest laser power, at the lowest angular velocity, with multiple passes, the laser may be used to damage the Power Calibration Area. Alternatively, the laser may be used to write into the Power Calibration Area when the disk is stationary.

Alternatively, the laser may be used to modify a label or coating. For example, a transparent adhesive label may be attached to the original medium by the manufacturer of the medium. The label material may then be darkened by sufficient laser exposure, by using high power with multiple passes or while the disk is stationary. Then, if desired, the darkened adhesive label could be removed. Multiple transparent labels could be attached in a stack, with the top label darkened, and then removed, with additional removable labels available for additional write protects.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for write protection of a disk, the disk having a power calibration area and a data area, the apparatus comprising:

a ring capable of being attached to the disk, the ring having a portion that covers the power calibration area but not the data area.

2. The apparatus of claim 1, the disk having a central hole and an indented area formed around the hole, the ring adapted for insertion into the indented area.

3. The apparatus of claim 1, the ring comprising an adhesive label.

4. The apparatus of claim 1, the ring being transparent initially, and then darkened by exposure to a laser.

5. An apparatus for write protection of a disk, the disk having a central hole and a power calibration area, the apparatus comprising:

a holder adapted to fit into the central hole of the disk; and an abrasive tool, rotating around the holder, adapted to abrade the power calibration area when rotated.

6. A method of write protection for a disk, the disk having a power calibration area for a laser and a data area, the method comprising:

shielding the power calibration area, but not the data area, of the disk from light sufficiently to prevent a disk drive from using the power calibration area to calibrate a laser.

7. The method of claim 6, the disk adapted to receive light from a laser having a particular wavelength, the step of shielding further comprising:

covering the power calibration area with a material that is non-transparent at the particular wavelength.

8. The method of claim 7, the material comprising an adhesive label.

9. The method of claim 7, the material comprising an ink.

10. The method of claim 7, the material comprising a dye.

11. The method of claim 7, the material comprising a paint.

* * * * *